Patented Jan. 10, 1950

2,493,789

UNITED STATES PATENT OFFICE 2,493,789

PRODUCTION OF CHROMATE

Marvin J. Udy, Niagara Falls, N. Y.

No Drawing. Application August 14, 1948,
Serial No. 44,399

14 Claims. (Cl. 23—56)

This invention relates to chromate production and has for an object the provision of an improved process for producing calcium chromate. The invention further contemplates the provision of an improved process for recovering chromium in the form of calcium chromate from chromite ore, chromite ore concentrates, altered chromite ore and similar chromium-bearing materials.

Throughout the specification and in the claims, the term "chromite ore" is intended to include natural chromite ore, altered chromite ore, chromite ore concentrates and similar chromite mineral-bearing materials.

According to some heretofore customary practices, chromite ores are subjected to oxidizing or roasting treatment in the presence of one or more alkali metal compounds such, for example, as sodium carbonate, sodium hydroxide and sodium sulphate under such conditions as to oxidize the trivalent chromium of the chromite ores to the hexavalent state and produce alkali metal chromates such, for example, as sodium chromate. Sodium chromate thus produced is separated from the product of the roasting or oxidizing treatment by leaching and crystallization and marketed as such or converted to sodium dichromate for marketing. Commercial sodium chromate and sodium dichromate are utilized as raw or intermediate materials in the production of other chromium-bearing compounds, including calcium chromate. Usually, the calcium chromate production operations are carried out independently of the sodium chromate production operations and, consequently, the sodium oxide content of the sodium chromate is wasted or, at any rate, is not recovered in a form in which it is readily available for re-use in the chromate production operations. For this reason, among others, calcium chromate is a relatively costly commercial product. Calcium chromate is a highly desirable material for many industrial uses, but its usefulness has not been developed fully because of its high cost.

The present invention provides for the production of calcium chromate under conditions and according to procedures such that the sodium oxide content of sodium chromate employed in its production is utilized for the production of additional sodium chromate.

The invention utilizes the reactions and procedures of the ammonia soda process in conjunction with a sodium chromate production process to provide a cyclic process for the production and recovery of calcium chromate with regeneration of the reagents of the ammonia soda process. The two procedures are combined with advantage to each and with substantial advantages resulting from the combination.

While the reactions involved are quite complex, they may be represented by the following equations for purposes of illustration:

(1) $4NaCl + 4NH_4HCO_3 = 4NaHCO_3 + 4NH_4Cl$
(2) 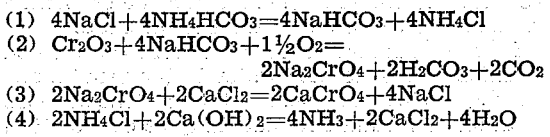
$Cr_2O_3 + 4NaHCO_3 + 1\tfrac{1}{2}O_2 = 2Na_2CrO_4 + 2H_2CO_3 + 2CO_2$
(3) $2Na_2CrO_4 + 2CaCl_2 = 2CaCrO_4 + 4NaCl$
(4) $2NH_4Cl + 2Ca(OH)_2 = 4NH_3 + 2CaCl_2 + 4H_2O$ The foregoing equations illustrate the principal reactions. The following equations illustrate additional reactions involved in the process:

(5) 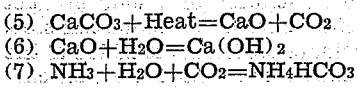 $CaCO_3 + Heat = CaO + CO_2$
(6) $CaO + H_2O = Ca(OH)_2$
(7) $NH_3 + H_2O + CO_2 = NH_4HCO_3$ A complete preferred process of the invention comprises (1) reacting sodium chloride and ammonium bicarbonate to produce sodium bicarbonate and ammonium chloride, (2) regenerating the ammonium bicarbonate by reacting the ammonium chloride with calcium hydroxide with the production of ammonia and calcium chloride and by reacting the ammonia thus produced with carbon dioxide in an aqueous liquid, (3) producing calcium chromate and simultaneously regenerating the sodium chloride by reacting chromic oxide with the sodium oxide of the sodium bicarbonate under oxidizing conditions to form sodium chromate and reacting the sodium chromate with the calcium chloride produced in regenerating the ammonium bicarbonate, (4) separating the calcium chromate from the regenerated sodium chloride, and (5) utilizing the regenerated sodium chloride and the regenerated ammonium bicarbonate to regenerate sodium bicarbonate for use in the production of additional calcium chromate.

As in the operation of the ammonia soda process to produce sodium bicarbonate as an end product, the production of sodium bicarbonate by reaction of sodium chloride and ammonium bicarbonate preferably includes the step of ammoniation of the sodium chloride-containing brine, the step of carbonating the ammoniated brine, and separation of the solid sodium bicarbonate from the mother liquor in the usual manner. Regeneration of the ammonium bicarbonate preferably includes the ammonia recovery step of the ammonia soda process involving the production of calcium chloride, utilization of the ammonia in the ammoniation of brine and carbonation of the ammoniated brine, as in the ammonia soda process.

The sodium chromate producing phase of the calcium chromate production and sodium chloride regeneration operation preferably is carried out in accordance with known procedures involving the roasting in air of finely divided chromite ore in the presence of available sodium oxide. The sodium oxide may be produced by employing sodium bicarbonate directly or by employing soda ash produced through decomposition of the sodium bicarbonate. The effect is the same whether sodium bicarbonate or soda ash is employed. The sodium bicarbonate or soda ash is employed in amount sufficient to provide sodium oxide for combining with all of the chromium of the chromite ore when converted to the hexavalent state to form chromium trioxide. The sodium bicarbonate or the soda ash is mixed intimately with the chromite ore of the roasting charge, and the charge is heated to a temperature in the range 750° C. to 1100° C. In the course of the heating operation in the presence of air, the sodium bicarbonate or the soda ash is decomposed to form sodium oxide, the chromic oxide ($Cr_2O_3$) of the chromite ore is oxidized to chromium trioxide ($CrO_3$), and the sodium oxide and the chromium trioxide react to produce sodium chromate.

Sodium chromate is leached from the roasted or oxidized charge with water in the usual manner to produce an aqueous solution. The aqueous solution of sodium chromate may be employed in the calcium chromate production step directly, or the solution of sodium chromate may be concentrated or evaporated to dryness to produce either a concentrated solution or a solid product for use in the calcium chromate production step.

The sodium chromate preferably is added to the calcium chloride-containing solution, which corresponds to the distiller waste solution of the ammonia soda process, while the solution contains the heat absorbed in the distillation operation. Incidentally, the distiller waste solution also contains the sodium chloride not utilized in the conversion to sodium bicarbonate. The calcium chloride-containing solution to which the sodium chromate is added preferably is heated to a temperature equivalent at least to the boiling temperature at atmospheric pressure, and it preferably is heated to a temperature in the range, 120° C. to 135° C., under a pressure in the range, 15 to 30 pounds per square inch, to effect precipitation of anhydrous calcium chromate. At temperatures and pressures in the ranges indicated, precipitation of calcium chromate virtually is complete. Complete removal of the calcium chromate is not essential to the economy of the process, as the mother liquor from the precipitation treatment is to be re-cycled to regenerate sodium bicarbonate, and chromate remaining therein will not interfere with the reactions involved in the ammonia soda process. The chromate will remain in the system without loss. When equilibrium has been established, calcium chromate equivalent to the sodium chromate employed will be obtained at a uniform rate. The advantage resulting from avoidance of the necessity for complete elimination of the chromate far outweighs the slight disadvantage of increased circulating load incident to retention of a small amount of chromate.

The calcium chromate is separated from the mother liquor by filtration, and, after washing and drying, it is ready for use or marketing.

The mother liquor may be subjected to an evaporation concentration treatment or not, depending upon the amount of dilution water employed in the process. In the ammonia soda process designed and operated for the production of a sodium bicarbonate product for marketing as such, dilution water may be introduced at two points, namely, at the filters as wash water for the sodium bicarbonate, and in the distiller in the form of milk of lime. In the process of the invention, washing of the sodium bicarbonate at the filters is unnecessary because the crude product can be employed directly in the chromate production step, and, if desired, the lime may be added in the solid state to the distillers to avoid the introduction of water into the system. In the process of the invention, diluent water may be added with the sodium chromate, but addition at this point can be avoided by employing the sodium chromate in the form of a solid. If the addition of diluent water through washing and reagent addition is eliminated completely, it will be necessary to add make-up water to compensate for evaporation. In any event the functioning of the process of the invention can be so controlled that evaporation costs will be slight or even negligible.

The combined use of the principles and reactions of the ammonia soda process and the principles and reactions of a calcium chromate production process permits the achievement of the following advantages, among others:

(1) It permits re-use of the brine with a saving in cost of raw materials, a saving in the cost of preparing and purifying the brine and with the establishment of more uniform conditions leading to greater efficiency through the use of brine of the same composition in all ammoniation and carbonation operations.

(2) It permits the saving and utilization in the production of the end product of the combined process of calcium chloride which normally is wasted in the ammonia soda process.

(3) It conserves the heat of the distiller waste solution which normally is dissipated without accomplishing a useful result or is used inefficiently, and it permits utilization of the heat directly in the production of the end product of the combined process.

(4) It permits a saving in labor and equipment costs by permitting elimination of washing of the sodium bicarbonate at the filters.

I claim:

1. A cyclic process for producing calcium chromate which comprises (1) reacting sodium chloride and ammonium bicarbonate to produce sodium bicarbonate and ammonium chloride, (2) regenerating the ammonium bicarbonate by reacting the ammonium chloride with calcium hydroxide with the production of ammonia and calcium chloride and by reacting the ammonia thus produced with carbon dioxide in an aqueous liquid, (3) producing calcium chromate and simultaneously regenerating the sodium chloride by reacting chromic oxide with the sodium oxide of the sodium bicarbonate under oxidizing conditions to form sodium chromate and reacting the sodium chromate with the calcium chloride produced in regenerating the ammonium bicarbonate, (4) separating the calcium chromate from the regenerated sodium chloride, and (5) utilizing the regenerated sodium chloride and the regenerated ammonium bicarbonate to regenerate sodium bicarbonate for use in the production of additional calcium chromate.

2. A cyclic process for producing calcium chromate which comprises (1) reacting sodium chloride and ammonium bicarbonate in aqueous solution to produce sodium bicarbonate and ammonium chloride, (2) regenerating the ammonium bicarbonate by reacting the ammonium chloride with calcium hydroxide in aqueous solution with the production of ammonia and calcium chloride and by reacting the ammonia thus produced with carbon dioxide in an aqueous liquid, (3) producing calcium chromate and simultaneously regenerating the sodium chloride by reacting chromic oxide with the sodium oxide of the sodium bicarbonate under oxidizing conditions to form sodium chromate and reacting the sodium chromate with the calcium chloride produced in regenerating the ammonium bicarbonate at an elevated temperature, (4) separating the calcium chromate from the regenerated sodium chloride, and (5) utilizing the regenerated sodium chloride and the regenerated ammonium bicarbonate to regenerate sodium bicarbonate for use in the production of additional calcium chromate.

3. A cyclic process for producing calcium chromate which comprises (1) reacting sodium chloride and ammonium bicarbonate in aqueous solution to produce sodium bicarbonate and ammonium chloride, (2) regenerating the ammonium bicarbonate by reacting the ammonium chloride with calcium hydroxide in aqueous solution with the production of ammonia and calcium chloride and by reacting the ammonia thus produced with carbon dioxide in an aqueous liquid, (3) producing calcium chromate and simultaneously regenerating the sodium chloride by reacting chromic oxide with the sodium oxide of the sodium bicarbonate under oxidizing conditions to form sodium chromate and reacting the sodium chromate with the calcium chloride produced in regenerating the ammonium bicarbonate in aqueous solution at a boiling temperature, (4) separating the calcium chromate from the regenerated sodium chloride and (5) utilizing the regenerated sodium chloride and the regenerated ammonium bicarbonate to regenerate sodium bicarbonate for use in the production of additional calcium chromate.

4. A cyclic process for producing calcium chromate which comprises (1) reacting sodium chloride and ammonium bicarbonate in aqueous solution to produce sodium bicarbonate and ammonium chloride, (2) regenerating the ammonium bicarbonate by reacting the ammonium chloride with calcium hydroxide in aqueous solution with the production of ammonia and calcium chloride and by reacting the ammonia thus produced with carbon dioxide in an aqueous liquid, (3) producing calcium chromate and simultaneously regenerating the sodium chloride by reacting chromic oxide with the sodium oxide of the sodium bicarbonate under oxidizing conditions to form sodium chromate and reacting the sodium chromate with the calcium chloride produced in regenerating the ammonium bicarbonate in aqueous solution under pressure at a temperature above 100° C., (4) separating the calcium chromate from the regenerated sodium chloride and (5) utilizing the regenerated sodium chloride and the regenerated ammonium bicarbonate to regenerate sodium bicarbonate for use in the production of additional calcium chromate.

5. A cyclic process for producing calcium chromate which comprises (1) reacting sodium chloride and ammonium bicarbonate in aqueous solution to produce sodium bicarbonate and ammonium chloride, (2) regenerating the ammonium bicarbonate by reacting the ammonium chloride with calcium hydroxide in aqueous solution with the production of ammonia and calcium chloride and by reacting the ammonia thus produced with carbon dioxide in an aqueous liquid, (3) producing calcium chromate and simultaneously regenerating the sodium chloride by reacting chromic oxide with the sodium oxide of the sodium bicarbonate under oxidizing conditions to form sodium chromate and reacting the sodium chromate with the calcium chloride produced in regenerating the ammonium bicarbonate in aqueous solution under pressure above 15 pounds per square inch at a temperature above 120° C., (4) separating the calcium chromate from the regenerated sodium chloride and (5) utilizing the regenerated sodium chloride and the regenerated ammonium bicarbonate to regenerate sodium bicarbonate for use in the production of additional calcium chromate.

6. A cyclic process for producing calcium chromate which comprises (1) reacting sodium chloride and ammonium bicarbonate in aqueous solution to produce sodium bicarbonate and ammonium chloride, (2) regenerating the ammonium bicarbonate by reacting the ammonium chloride with calcium hydroxide in aqueous solution with the production of ammonia and calcium chloride and by reacting the ammonia thus produced with carbon dioxide in an aqueous liquid, (3) producing calcium chromate and simultaneously regenerating the sodium chloride by reacting chromic oxide with the sodium oxide of the sodium bicarbonate under oxidizing conditions to form sodium chromate and reacting the sodium chromate with the calcium chloride produced in regenerating the ammonium bicarbonate in aqueous solution under pressure at a temperature in the range 120° C. to 135° C., (4) separating the calcium chromate from the regenerated sodium chloride and (5) utilizing the regenerated sodium chloride and the regenerated ammonium bicarbonate to regenerate sodium bicarbonate for use in the production of additional calcium chromate.

7. A cyclic process for producing calcium chromate which comprises (1) reacting sodium chloride and ammonium bicarbonate in aqueous solution to produce sodium bicarbonate and ammonium chloride, (2) regenerating the ammonium bicarbonate by reacting the ammonium chloride with calcium hydroxide in aqueous solution with the production of ammonia and calcium chloride and by reacting the ammonia thus produced with carbon dioxide in an aqueous liquid, (3) producing calcium chromate and simultaneously regenerating the sodium chloride by reacting chromic oxide with the sodium oxide of the sodium bicarbonate under oxidizing conditions to form sodium chromate and reacting the sodium chromate with the calcium chloride produced in regenerating the ammonium bicarbonate in aqueous solution under pressure in the range 15 to 30 pounds per square inch, at a temperature in the range, 120° C. to 135° C., (4) separating the calcium chromate from the regenerated sodium chloride and (5) utilizing the regenerated sodium chloride and the regenerated ammonium bicarbonate to regenerate sodium bicarbonate for use in the production of additional calcium chromate.

8. A cyclic process for producing calcium chromate which comprises (1) reacting sodium chloride and ammonium bicarbonate to produce sodium bicarbonate and ammonium chloride, (2) regenerating the ammonium bicarbonate by reacting the ammonium chloride with calcium hydroxide with the production of ammonia and calcium chloride and by reacting the ammonia thus produced with carbon dioxide in an aqueous liquid, (3) producing calcium chromate and simultaneously regenerating the sodium chloride by reacting chromic oxide with the sodium oxide of the sodium bicarbonate under oxidizing conditions to form sodium chromate and reacting the sodium chromate with the calcium chloride produced in regenerating the ammonium bicarbonate, (4) separating the calcium chromate from the regenerated sodium chloride, and (5) utilizing the regenerated sodium chloride and the regenerated ammonium bicarbonate to regenerate sodium bicarbonate for use in the production of additional calcium chromate, the reaction between the chromic oxide and the sodium oxide of the bicarbonate being effected by roasting a mixture comprising chromite ore and the sodium oxide in air at a temperature in the range 750° C. to 1100° C.

9. A cyclic process for producing calcium chromate which comprises (1) reacting sodium chloride and ammonium bicarbonate in aqueous solution to produce sodium bicarbonate and ammonium chloride, (2) regenerating the ammonium bicarbonate by reacting the ammonium chloride with calcium hydroxide in aqueous solution with the production of ammonia and calcium chloride and by reacting the ammonia thus produced with carbon dioxide in an aqueous liquid, (3) producing calcium chromate and simultaneously regenerating the sodium chloride by reacting chromic oxide with the sodium oxide of the sodium bicarbonate under oxidizing conditions to form sodium chromate and reacting the sodium chromate with the calcium chloride produced in regenerating the ammonium bicarbonate at an elevated temperature, (4) separating the calcium chromate from the regenerated sodium chloride, and (5) utilizing the regenerated sodium chloride and the regenerated ammonium bicarbonate to regenerate sodium bicarbonate for use in the production of additional calcium chromate, the reaction between the chromic oxide and the sodium oxide of the bicarbonate being effected by roasting a mixture comprising chromite ore and the sodium oxide in air at a temperature in the range 750° C. to 1100° C.

10. A cyclic process for producing calcium chromate which comprises (1) reacting sodium chloride and ammonium bicarbonate in aqueous solution to produce sodium bicarbonate and ammonium chloride, (2) regenerating the ammonium bicarbonate by reacting the ammonium chloride with calcium hydroxide in aqueous solution with the production of ammonia and calcium chloride and by reacting the ammonia thus produced with carbon dioxide in an aqueous liquid, (3) producing calcium chromate and simultaneously regenerating the sodium chloride by reacting chromic oxide with the sodium oxide of the sodium bicarbonate under oxidizing conditions to form sodium chromate and reacting the sodium chromate with the calcium chloride produced in regenerating the ammonium bicarbonate in aqueous solution at a boiling temperature, (4) separating the calcium chromate from the regenerated sodium chloride and (5) utilizing the regenerated sodium chloride and the regenerated ammonium bicarbonate to regenerate sodium bicarbonate for use in the production of additional calcium chromate, the reaction between the chromic oxide and the sodium oxide of the bicarbonate being effected by roasting a mixture comprising chromite ore and the sodium oxide in air at a temperature in the range 750° C. to 1100° C.

11. A cyclic process for producing calcium chromate which comprises (1) reacting sodium chloride and ammonium bicarbonate in aqueous solution to produce sodium bicarbonate and ammonium chloride, (2) regenerating the ammonium bicarbonate by reacting the ammonium chloride with calcium hydroxide in aqueous solution with the production of ammonia and calcium chloride and by reacting the ammonia thus produced with carbon dioxide in an aqueous liquid, (3) producing calcium chromate and simultaneously regenerating the sodium chloride by reacting chromic oxide with the sodium oxide of the sodium bicarbonate under oxidizing conditions to form sodium chromate and reacting the sodium chromate with the calcium chloride produced in regenerating the ammonium bicarbonate in aqueous solution under pressure at a temperature above 100° C., (4) separating the calcium chromate from the regenerated sodium chloride and (5) utilizing the regenerated sodium chloride and the regenerated ammonium bicarbonate to regenerate sodium bicarbonate for use in the production of additional calcium chromate, the reaction between the chromic oxide and the sodium oxide of the bicarbonate being effected by roasting a mixture comprising chromite ore and the sodium oxide in air at a temperature in the range 750° C. to 1100° C.

12. A cyclic process for producing calcium chromate which comprises (1) reacting sodium chloride and ammonium bicarbonate in aqueous solution to produce sodium bicarbonate and ammonium chloride, (2) regenerating the ammonium bicarbonate by reacting the ammonium chloride with calcium hydroxide in aqueous solution with the production of ammonia and calcium chloride and by reacting the ammonia thus produced with carbon dioxide in an aqueous liquid, (3) producing calcium chromate and simultaneously regenerating the sodium chloride by reacting chromic oxide with the sodium oxide of the sodium bicarbonate under oxidizing conditions to form sodium chromate and reacting the sodium chromate with the calcium chloride produced in regenerating the ammonium bicarbonate in aqueous solution under pressure above 15 pounds per square inch at a temperature above 120° C., (4) separating the calcium chromate from the regenerated sodium chloride and (5) utilizing the regenerated sodium chloride and the regenerated ammonium bicarbonate to regenerate sodium bicarbonate for use in the production of additional calcium chromate, the reaction between the chromic oxide and the sodium oxide of the bicarbonate being effected by roasting a mixture comprising chromite ore and the sodium oxide in air at a temperature in the range 750° C. to 1100° C.

13. A cyclic process for producing calcium chromate which comprises (1) reacting sodium chloride and ammonium bicarbonate in aqueous solution to produce sodium bicarbonate and ammonium chloride, (2) regenerating the ammonium bicarbonate by reacting the ammonium chloride with calcium hydroxide in aqueous solution with the production of ammonia and calcium chloride and by reacting the ammonia thus produced with carbon dioxide in an aqueous liquid, (3) producing calcium chromate and simultaneously regenerating the sodium chloride by reacting chromic oxide with the sodium oxide of the sodium bicarbonate under oxidizing conditions to form sodium chromate and reacting the sodium chromate with the calcium chloride produced in regenerating the ammonium bicarbonate in aqueous solution under pressure at a temperature in the range 120° C. to 135° C., (4) separating the calcium chromate from the regenerated sodium chloride and (5) utilizing the regenerated sodium chloride and the regenerated ammonium bicarbonate to regenerate sodium bicarbonate for use in the production of additional calcium chromate, the reaction between the chromic oxide and the sodium oxide of the bicarbonate being effected by roasting a mixture comprising chromite ore and the sodium oxide in air at a temperature in the range 750° C. to 1100° C.

14. A cyclic process for producing calcium chromate which comprises (1) reacting sodium chloride and ammonium bicarbonate in aqueous solution to produce sodium bicarbonate and ammonium chloride, (2) regenerating the ammonium bicarbonate by reacting the ammonium chloride with calcium hydroxide in aqueous solution with the production of ammonia and calcium chloride and by reacting the ammonia thus produced with carbon dioxide in an aqueous liquid, (3) producing calcium chromate and simultaneously regenerating the sodium chloride by reacting chromic oxide with the sodium oxide of the sodium bicarbonate under oxidizing conditions to form sodium chromate and reacting the sodium chromate with the calcium chloride produced in regenerating the ammonium bicarbonate in aqueous solution under pressure in the range, 15 to 30 pounds per square inch, at a temperature in the range, 120° C. to 135° C., (4) separating the calcium chromate from the regenerated sodium chloride and (5) utilizing the regenerated sodium chloride and the regenerated ammonium bicarbonate to regenerate sodium bicarbonate for use in the production of additional calcium chromate, the reaction between the chromic oxide and the sodium oxide of the bicarbonate being effected by roasting a mixture comprising chromite ore and the sodium oxide in air at a temperature in the range 750° C. to 1100° C.

MARVIN J. UDY.

REFERENCES CITED

The following references are of record in the file of this patent:

UNITED STATES PATENTS

| Number | Name | Date |
|---|---|---|
| 200,134 | Fahlberg | Feb. 12, 1878 |
| 1,955,326 | Demant | Apr. 17, 1934 |
| 2,402,103 | Udy | June 11, 1946 |

OTHER REFERENCES

The Chemical Catalog Co., Inc., Hou, "Manufacture of Soda," (1933).